United States Patent [19]

Tamamura et al.

[11] Patent Number: 4,714,333
[45] Date of Patent: Dec. 22, 1987

[54] WATER-PROOF WINDOW STRUCTURE OF WATER-PROOF CAMERA

[75] Inventors: Hideo Tamamura; Hiroshi Maeno, both of Tokyo, Japan

[73] Assignee: Canon Kabushiki Kaisha, Tokyo, Japan

[21] Appl. No.: 761,187

[22] Filed: Jul. 31, 1985

[30] Foreign Application Priority Data

Aug. 4, 1984 [JP] Japan .............. 59-119990[U]

[51] Int. Cl.$^4$ .............................................. G03B 17/08
[52] U.S. Cl. .............................................. 354/64
[58] Field of Search ............... 354/64, 217, 218, 288; 206/316, 578

[56] References Cited

U.S. PATENT DOCUMENTS

| | | | |
|---|---|---|---|
| 2,573,885 | 11/1951 | Whitman et al. | 354/64 |
| 2,797,804 | 7/1957 | Pomeroy et al. | 206/316 X |
| 3,121,378 | 2/1964 | Lange | 354/217 |
| 3,162,107 | 12/1964 | Byers | 354/64 |
| 3,759,605 | 9/1973 | Johnson | 354/64 X |
| 4,295,721 | 10/1981 | Rebikoff | 354/64 |

OTHER PUBLICATIONS

Photographic Trade News, 354-64, Apr. 1980, vol. 44, No. 8, pp. 26 & 31.

Primary Examiner—Donald A. Griffin
Attorney, Agent, or Firm—Toren, McGeady & Associates

[57] ABSTRACT

In a front cover which forms a peripheral portion of a camera of water-proof structure, window parts for a photo-taking lens and for the objective part of a viewfinder are formed with protective optical members by insert-molding; a flashlight emission window part is formed also in the front cover with a Fresnel member also by insert-molding; and a counter window part which is disposed on the upper side of the front cover has inner and outer windows made of transparent members and attached to the inner and outer sides thereof by means of double-face adhesive tape respectively.

9 Claims, 6 Drawing Figures

WATER-PROOF WINDOW STRUCTURE OF WATER-PROOF CAMERA

BACKGROUND OF THE INVENTION

1. Field of the Invention

This invention relates to the water-proof structure of a front cover which forms a peripheral portion of a water-proof camera and more particularly to the water-proof structural arrangement of the window parts of the front cover.

2. Description of the Prior Art

The front cover of a water-proof camera which forms a peripheral portion of the camera has light transmissive parts or windows. These window parts are provided for a photo-taking optical system, a view-finder objective part, a counter, a flashlight emission part, etc. Heretofore, transparent plates made of a glass or plastic material have been used to form the windows for the optical system, the view-finder objective part, the counter, etc. and a protector such as a Fresnel member for the flashlight emission window with a packing seal material applied to these window parts to attain water-tightness. The conventional water-proof structural arrangement, however, not only increases the size of the camera but also results in a high cost.

A solution of this problem has been contrived as shown in FIG. 1 of the accompanying drawings. In this prior art contrivance, a circular recess 1b is provided on the outside of an aperture 1a formed in a front cover 1. An annular double-face adhesive tape 3 is applied to the bottom face of the recess 1b. Then, an outer window 2 made of a transparent material is fitted into the recess 1b. When the camera is placed underwater, pressure of 1 atm. is applied per 10 m of the depth of water to the front cover from outside in the direction of arrow A. Therefore, the outer window 2 would never be removed by this external pressure. However, the window 2 is vulnerable to internal pressure exerted from inside.

The internal pressure develops due to a rise in the inside temperature of the camera. Assuming that the back lid of the camera is closed when the inside temperature of the camera is at 0° C. and the camera is left on the dash board of an automobile under direct rays of the sun, the inside temperature of the camera sometimes rises up to 60° C. or above. Under such a condition, the inner pressure of the camera rises up to 1.2 atm. or above according to Boyle's and Charles' laws. In that event, differential pressure of about 0.2 atm. may develop across the outer window 2. Then, the differential pressure of 0.2 atm. comes to exert a force of about 0.2 kg-f/cm$^2$ on the window 2. Assuming that the window 2 measures 1 cm$^2$ in size, the window 2 is constantly under the force of 0.2 kg-f which is exerted in the direction of arrow B. In addition to that, the adhesive strength or power of the double-face adhesive tape 3 tends to be weakened by the above-stated temperature of 60° C. Therefore, the prior art arrangement exposes the camera to a grave danger under such a condition.

SUMMARY OF THE INVENTION

This invention is directed to the solution of the above-stated problem of the arrangement of the prior art. It is therefore an object of this invention to provide a water-proof window structure of a water-proof camera which is strong against both external pressure and internal pressure. To attain this object, a camera according to this invention has a counter window part arranged to have transparent inner and outer windows bonded to both the inside and outside of the window part by means of double-face adhesive tape.

The above and further objects and features of this invention will become apparent from the following detailed description of specific embodiments thereof taken in conjunction with the accompanying drawings.

DETAILED DESCRIPTION OF THE PREFERRED EMBODIMENTS

The following describes an embodiment of this invention with reference to the accompanying drawings.

Figure 1:
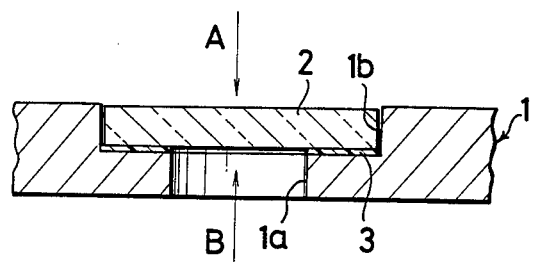
FIG. 1 is a sectional view showing the essential parts of a counter window arranged in the conventional water-proof camera.
Figure 2:
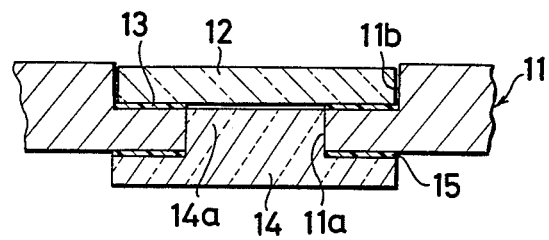
FIG. 2 is a sectional view showing the essential parts of a counter window part arranged in a water-proof camera according to this invention as an embodiment thereof.
Figure 4:
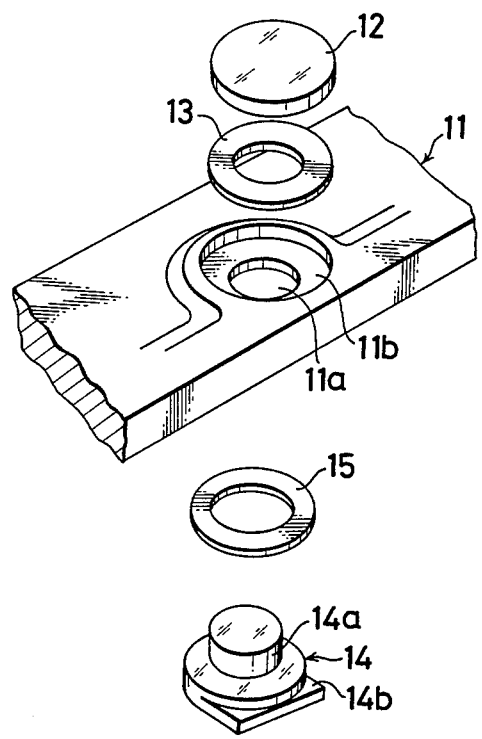
FIG. 4 is an exploded oblique view of the window part of FIG. 2.

FIG. 2 shows a counter window part of a water-proof camera arranged according to this invention. The illustration includes a front cover 11 which forms a peripheral portion of the camera which is arranged to have a water-proof structure. The front cover 11 has an aperture 11a which is arranged to serve as a counter window part. A recess 11b is provided on the outer side of the aperture 11a. An outer window 12 which is made of a transparent glass or plastic material is fitted into and bonded to the bottom face of the recess 11b by means of a double-face adhesive tape 13. In combination with the outer window 12, an inner window 14 made of a transparent glass or plastic material is bonded by means of an annular double-face adhesive tape 15 to the inner side of the aperture 11a. The inner window 14 is provided with a cylindrical part 14a which is of a suitable height and is fitted into the aperture 11a. As shown in FIG. 4, the inner window 14 is provided further with a claw part 14b which permits removal of the inner window 14 in the event of replacement of the outer window 12 by allowing a driver or the like to engage the claw part 14b. Further, the bonding surface of the outer window 12 arranged for the double-face adhesive tape 13 is printed with an opaque ink on its reverse surface in an annular shape. Therefore, the bonding surface of the double-face adhesive tape 13 is not observable from outside.

Figure 3:
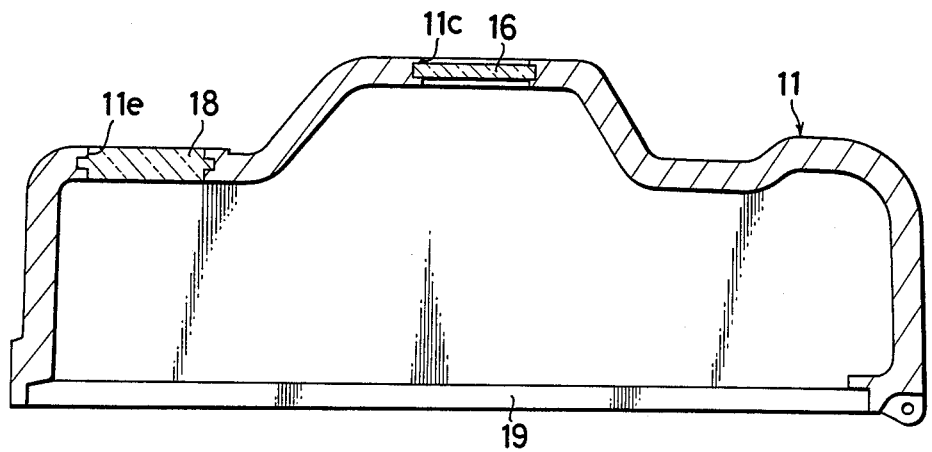
FIG. 3 is a sectional view showing the essential parts of the front cover of the same water-proof camera.
Figure 5:
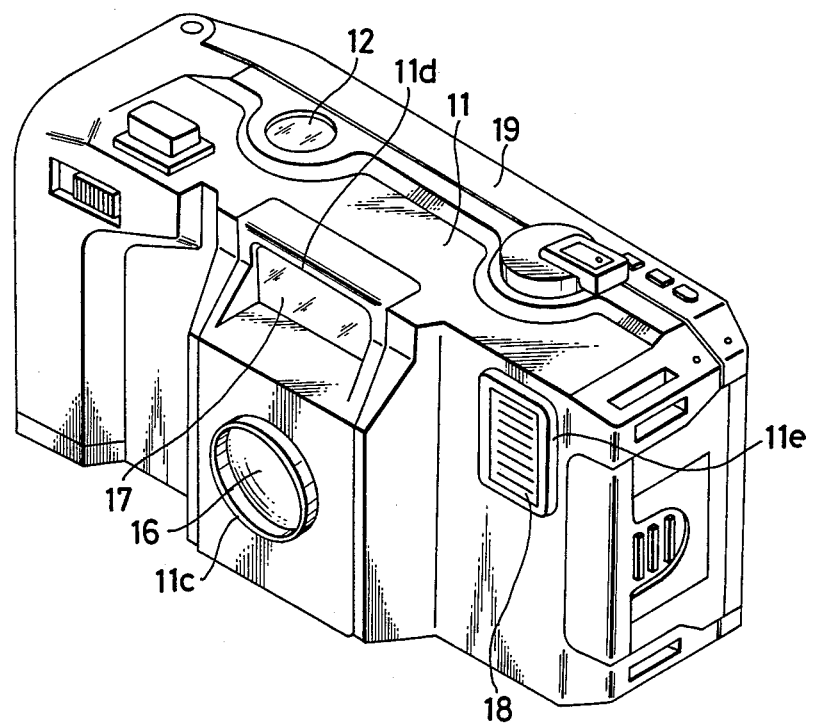
FIG. 5 is an oblique view showing the whole appearance of the same water-proof camera.

The front cover 11 is also provided with a window part 11c for a photo-taking lens, a window part 11d for a view-finder objective part and a window part 11e for flashlight emission. The window parts 11c and 11d are provided with protective glass or plastic optical members 16 and 17. The window part 11e is provided with a protective Fresnel member 18. All these members 16, 17 and 18 are respectively formed in one unified body with the front cover 11 by insert-molding as shown in FIGS. 3 and 5. If the outer window 12 of the counter window part could be likewise formed by insert-molding in the same manner as other window parts 11c, 11d and 11e, such arrangement would be advantageous in terms of strength against external and internal pressure and reduction in the number of parts required. However, the counter window part cannot be insert-molded because of the following technical difficulty:

In carrying out the insert-molding, a part which is desired to be inserted is placed on the die of a molding machine. After that, the die is closed and a plastic material is poured into the die for molding. However, the inserting part which is placed within the die must be held in place by means of several pins erected on the die and, in addition to this, the whole window part is to be adsorbed by a vacuum. The structural arrangement of the mold for the front cover 11 is as follows:

The die consists of six mold parts for various parts of the appearance of the front cover 11 including upper, lower, left, right, front and rear parts. The inserting parts which are the window parts 11c, 11d and 11e shown in FIGS. 3 and 5 all have the normal lines of their surfaces in parallel and also in the same direction as the direction in which the rear part of the die is to be withdrawn. Therefore, these three inserting parts can be held on the rear part of the die.

However, in the case of the outer window 12 of the counter window part, as shown in FIG. 5, it normally has its normal line differently from that of the protective optical member 16 of the window part 11e for the photo-taking lens. Therefore, if the outer window 12 of the counter window part is insert-molded by keeping it on the rear part of the die, the outer window holding pin cannot be pulled out from the mold after completion of molding. Thus, the molding of the outer window 12 on the rear part of the die is impossible. The outer window 12 of the counter window part can be insert-molded by holding it on the upper part molding die part. In that event, however, the trace of a holding pin will remain on the outside of the camera; piping for the above-stated vacuum adsorption must be arranged for two die parts; and the inserting parts must be kept in place on separate die part. Therefore, such arrangement is not feasible because of these problems in terms of workability.

Therefore, in this embodiment, since the counter window part is disposed on the upper side of the front cover 11 and has different normal lines from those of the window members of other window parts including the window part 11c for the photo-taking lens, etc. which are disposed on the front side of the front cover 11, the window members of the counter window part are arranged to be applied to the aperture, one from outside and the other from inside, and bonded by means of the double-face adhesive tape in the manner as described in the foregoing.

The camera is provided with a back lid 19 which is carried by the rear side edges of the front cover 11.

With the embodiment arranged as described above, the external pressure and the internal pressure which are applied to these window parts are received by the protective optical members 16 and 17 and the Fresnel member 18 on the front side of the water-proof camera. Meanwhile, the external pressure and internal pressure applied to the counter window part which is disposed on the upper side of the camera are received jointly by the outer and inner windows 12 and 14 in such a manner that they mutually prevent each other from being dislodged by the pressure thus applied.

In cases where it is desired to have the inner window 14 arranged to be removable from outside, the inner window 14 may be arranged to have the same holding structure as that of the outer window 12.

Figure 6:
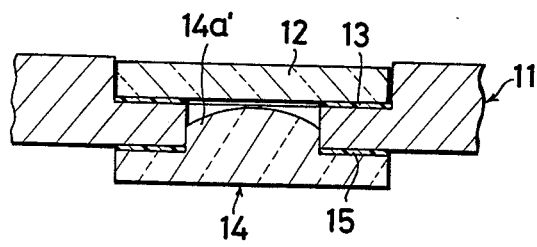
FIG. 6 is a sectional view showing the essential parts of another embodiment of this invention.

FIG. 6 shows another embodiment of this invention. In this embodiment, the end face of the cylindrical part 14a of the inner window 14 of the counter window part which is flat in the case of the preceding embodiment described in the foregoing is formed in a convex shape 14a'. The convex lens shaped cylindrical part 14a' imparts a lens effect to the inner window 14, so that the display of a counter or the like can be observed in an enlarged state.

In accordance with this invention, as described in the foregoing, the window parts of the front cover which are required to have an optical function are provided with protective optical members formed in one unified body with the front cover by insert-molding. Meanwhile, the counter window part of the front cover is provided with inner and outer windows which are bonded to the inside and outside of the counter window part by means of double-face adhesive tape to make this part strong against both external and internal pressure, so that the atmospheric pressure never dislodges these windows and the water-proof structure can be kept unimpaired with a simple arrangement.

What is claimed is:

1. A water-proof camera having window parts, comprising:
   a cover for covering said camera, said cover being provided with apertures on the front side thereof for a photo-taking lens and a view-finder and another aperture on the upper side thereof for a counter;
   a first protective optical member fitted in said aperture for said photo-taking lens by insert molding;
   a second protective optical member fitted in said aperture for said view-finder by insert molding;
   an outer window fitted into said aperture for said counter;
   first means for securing said outer window to said cover and for preventing said outer window from pulling out to the inside of said camera;
   an inner window fitted in said aperture for the counter; and
   second means for securing said inner window to said cover and for preventing said inner window from pulling out to the outside of said camera.

2. A camera body comprising:
   (A) a camera body;
   (B) a front side optical member on the front side of the camera body, said front side optical member being secured to the camera body by insert molding;
   (C) upper side optical members arranged on the upper side of the camera body, said upper side optical members being cemented together from the inner and outer sides of the camera body in such a manner as to hold the camera body therebetween.

3. A camera according to claim 2, wherein the camera is a water-proof camera.

4. A camera according to claim 2, wherein said front side optical member includes a photographic optical member.

5. A camera according to claim 2, wherein said front side optical member includes a finder optical member.

6. A camera according to claim 2, wherein said front side optical member includes a strobe optical member.

7. A camera according to claim 2, wherein said upper side optical member includes a counting optical member.

8. A camera, comprising:
(A) a camera body;
(B) a first member arranged on one side of the camera body by insert molding;
(C) second members arranged on another side of the camera body having about 90° angle relative to one side, said second members being cemented together from the inner and outer sides of the camera body in such a manner as to hold the camera body therebetween.

9. A camera, comprising:
(A) a camera body having an aperture;
(B) a first optical member secured to the aperture of the camera from the outside;
(C) a second optical member secured to the aperture of the camera from the inside, and
(D) a claw portion integrally formed with said second optical member for making said second optical member removable.

* * * * *